United States Patent
Lawman et al.

(10) Patent No.: US 7,596,702 B2
(45) Date of Patent: Sep. 29, 2009

(54) NETWORK STORAGE DEVICES

(75) Inventors: Matthew John Lawman, Bath (GB); Siani Lynne Pearson, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1842 days.

(21) Appl. No.: 10/180,977

(22) Filed: Jun. 27, 2002

(65) Prior Publication Data

US 2003/0033495 A1 Feb. 13, 2003

(30) Foreign Application Priority Data

Jun. 27, 2001 (GB) .................................. 0115641.3

(51) Int. Cl.
 G06F 21/02 (2006.01)
 G06F 12/14 (2006.01)
(52) U.S. Cl. ......................................... 713/193; 726/26
(58) Field of Classification Search ...................... 726/1, 726/2, 3
See application file for complete search history.

(56) References Cited

U.S. PATENT DOCUMENTS

| | | | |
|---|---|---|---|
| 5,379,344 A | 1/1995 | Larsson et al. | |
| 5,931,947 A * | 8/1999 | Burns et al. | 726/4 |
| 6,336,175 B1 * | 1/2002 | Shaath et al. | 711/163 |
| 6,336,187 B1 * | 1/2002 | Kern et al. | 713/161 |
| 6,393,420 B1 * | 5/2002 | Peters | 707/9 |
| 6,930,788 B1 | 8/2005 | Iwamoto et al. | |
| 6,931,503 B1 * | 8/2005 | Robb et al. | 711/163 |
| 6,938,154 B1 | 8/2005 | Berson et al. | |
| 6,948,065 B2 * | 9/2005 | Grawrock | 713/168 |
| 6,988,250 B1 * | 1/2006 | Proudler et al. | 716/1 |
| 7,236,455 B1 * | 6/2007 | Proudler et al. | 370/230 |
| 7,275,160 B2 * | 9/2007 | Pearson et al. | 713/172 |
| 2002/0026576 A1 * | 2/2002 | Das-Purkayastha et al. | 713/156 |
| 2002/0103904 A1 * | 8/2002 | Hay | 709/225 |

FOREIGN PATENT DOCUMENTS

| | | |
|---|---|---|
| EP | 0768606 | 4/1997 |
| GB | 2 340 630 A | 2/2000 |
| WO | 87/02154 | 4/1987 |
| WO | 99/31842 | 6/1999 |
| WO | 00/48063 | 8/2000 |

* cited by examiner

Primary Examiner—Christopher A Revak

(57) ABSTRACT

A storage box includes bulk non-volatile memory storage locations, an input/output unit for connection to a network, and a controller for controlling reading and writing of data from and to the storage locations. A trusted device is physically associated with/incorporated into the controller. At least one of the controller and the trusted device is configured such that in writing data to the memory storage locations, the data are stored in conjunction with a coded identifier which is associated with a person or organization that is authorized to read the data.

5 Claims, 4 Drawing Sheets

NETWORK STORAGE DEVICES

TECHNICAL FIELD

This invention relates to network storage devices which may take the form of tape drives, disk drives, or magnetic box storage devices for example.

BACKGROUND OF THE INVENTION

The provision and maintenance of reliable bulk non-volatile memory storage devices is increasingly likely to be made the responsibility of an organization which charges other people or organizations for the shared use of the storage devices. The computing platforms of those other organizations are linked to the storage devices by way of some network. One reason for such a commercial arrangement is that such bulk memory devices need to be very reliably operated and maintained, and the sharing of the facility by different organizations has advantages. For example, the physical security of the storage devices can be more easily afforded when the cost is shared by many users. Another reason is that storage needs cannot always be accurately predicted.

The invention is applicable to network storage devices in various environments such as NAS (network attached storage) and SAN (storage area network) environments.

The term 'storage box' is used herein to denote any bulk non-volatile memory storage device that is capable of being used as a network storage device. The invention is concerned with providing storage security features for such a storage box.

The wide availability of a storage box to different users gives rise to a need for security features. Most storage security features have in the past been provided in a local area network (LAN) by application software at a server or personal computer (PC) level but such solutions are not feasible in a NAS environment for example, since the software may be open to attack through the network connected to the server. For example, it is envisaged that tape drive software might be modified in an unauthorized manner so that it 'bounces' received sensitive material to other parts of the network for fraudulent purposes.

Typically the data stored in the storage box relate to financial transactions and bank account numbers, and it is desirable that such data should only be readable by the person or organization that has provided the data to the storage box, or with their permission.

DISCLOSURE OF THE INVENTION

We have appreciated that it would be advantageous to incorporate a trusted component into a storage box, and to store data in the storage box in conjunction with a coded identifier of the person or organization that is authorized to read that data.

According to one aspect of the invention a storage box comprises bulk non-volatile memory storage locations, an input-output unit for connection to a network, a controller for controlling reading and writing of data from and to the storage locations, and a trusted device physically associated with/incorporated into the controller, and at least one of the controller and the trusted device being such that in writing data to the memory storage locations, the data are stored in conjunction with a coded identifier which is associated with a person or organization that is authorized to read the data.

The term 'trusted device' means a device that can be 'trusted' to always behave in the expected manner for the intended purpose.

Preferably the trusted device is tamper-resistant. The trusted device preferably has an engine capable of using cryptographic processes to enable it to prove identity, both locally and at a distance.

The use of a trusted device in a computing platform such as a PC which is used to communicate with other computing platforms on a network is disclosed in the commonly owned Patent Specification No. WO 00/48063 (Application No. PCT/GB00/00528) and reference should be made to that specification for a discussion of the desirable functions capable of being performed by a preferred trusted device incorporated into such a computing platform.

The use of a TPM (trusted platform module) in relation to a TCP (trusted computing platform) has been specified by the TCPA (Trusted Computing Platform Alliance, formed initially by Compaq Computer Corporation, Hewlett-Packard Company, IBM Corporation, Intel Corporation, Microsoft Corporation) in the TCPA specification version 1.0 available via www.trustedpc.org.

When used in a PC, the trusted device desirably has the important function of reporting true values of integrity metrics of the software of the computing apparatus, such as of the BIOS memory.

A similar trusted device to the preferred TPM described in specification WO 00/48063 is suitable for use in the storage box utilized in the present invention, the TPM of the storage box incorporating a cryptographic function arranged to provide certificates of identity, and to establish the identity of another user on the network that is attempting to communicate with the storage box by use of TCPA procedures.

Preferably the use of the TPM in the storage box and those of the other user computing platforms connected to the network is conformant to the TCPA specification. The provision of a TPM in the storage box provides assurance to the user's computing platform that what needs to be trusted in the storage box can be trusted.

When the data of a user is required to be read by the user, or another person or organisation authorised by the user, hereinafter termed an 'authorised reader', the authorised reader must prove its authority to the storage box.

Since an identifier of an authorised reader has been stored in association with the stored data in the storage box, the TPM of the storage box is able to control the accessing of that stored data by ensuring that the user who requests to read the data must demonstrate its authority to read the stored data by use of the identifier stored with the data required to be accessed. This authorisation procedure is performed by the TPM of the storage box by carrying out an authentication procedure based upon the stored data identifier associated with the stored data with credentials provided by the prospective reader.

Preferably strong authentication is utilised in controlling release of data, such as by certificate exchange and presentation of some secret credentials previously associated with the data, eg a random number generated by the user.

Such strong authentication may involve the use of smartcards and authentication tokens. Some strong authentication systems employ onetime passwords that cannot be spoofed.

Preferably the identifier that is stored in the storage box in conjunction with the stored data has been produced in accordance with the TCPA principles, and the identity of the user is anonymous in the sense that no one but the issuing CA (Certification Authority) and the user knows the true identity of the user. So, for example, if the data relates to financial transactions and bank account numbers, even if the data could be read be others, the information itself would not be of any use since its owner could not be determined.

Preferably a user is associated with a plurality of user identifiers which relate to different spheres of the activity of the user, and the different categories of data of the user are stored in the storage box in conjunction with the different identifiers. This helps to prevent the identity of a user being established, even if the stored data is in some way illegally accessed, by identifying a particular pattern of spheres of activity of the user, By the use of different identifiers no linkage can be made within the storage box that the same user owns both sets of data. This can therefore help protect against privacy violations such as famous people's bank account details being revealed.

According to a second aspect of the invention we provide a method of storing different categories of data of a user in a storage box in accordance with the first aspect of the invention, the method comprising allotting different anonymous identifiers to different categories of the data associated with the same user and storing said identifiers with the respective data.

The access control mechanisms could be protected via the trusted component, preferably by being stored within it.

According to a third aspect of the invention there is provided a network storage device comprising bulk non-volatile memory means, input/output means for connection to a network, control means for controlling reading and writing of data from and to the memory means, and trusted device means which is physically associated with/incorporated into the control means, at least one of the control means and the trusted device means being configured such that in writing data to the memory means the data is stored in conjunction with a coded identifier which is associated with a person or organisation that is authorised to read the data.

According to a fourth aspect of the invention there is provided a network storage device comprising memory storage locations, a controller for controlling reading and writing to the memory locations, and a tamper-resistant trusted device which is in the form of an independently-encapsulated module, the trusted device comprising a data processor which is configured to process cryptographic data, and the network storage device being configured such that, in use, the data processor verifies a request from a remote computer to perform at least one of the steps of reading from and writing to at least one of the memory locations by verifying credential data sent by the remote computer, and the trusted device enabling the controller if the credential data is verified, and the trusted device being configured to cause data to be written to at least one of the memory storage locations in conjunction with a coded identifier which is associated with a person or organisation that is authorised to read the data.

According to a fifth aspect of the invention there is provided a method of storing data on a network storage device comprising a client computer sending identification data and data to be stored to the network storage device via a network link, a trusted device of the network storage device causing the data to be stored to be written to at least one memory storage location in conjunction with an identifier, the identifier being derived from the identification data sent by the client computer.

The identification data may be provided in a certificate which comprises data chosen by the client or the client computer.

The trusted device is preferably configured to use substantially the same data as the identification for the identifier. It will be appreciated, however, that the trusted device may operate on the identification data using further data or a particular function or functions to yield an identifier, and a memory of the trusted device storing a log of associated identification data and identifiers.

According to a sixth aspect of the invention there is provided a network comprising a network storage device and a client computer, the network storage device and the client computer being communicable via a network link, the network storage device comprising memory storage locations and a trusted device, the network being configured such that, in use, the client computer sends identification data and data to be stored to the network storage device and the trusted device of the network storage device causing the data to be stored to be written to at least one memory storage location in conjunction with an identifier, the identifier being derived from the identification data sent by the client computer.

BRIEF DESCRIPTION OF DRAWINGS

Various embodiments of the invention will now be described, by way of example only, with reference to the accompanying schematic drawings in which.

DETAILED DESCRIPTION OF THE DRAWING

Provision of a TPM in a Storage Box

Figure 1:
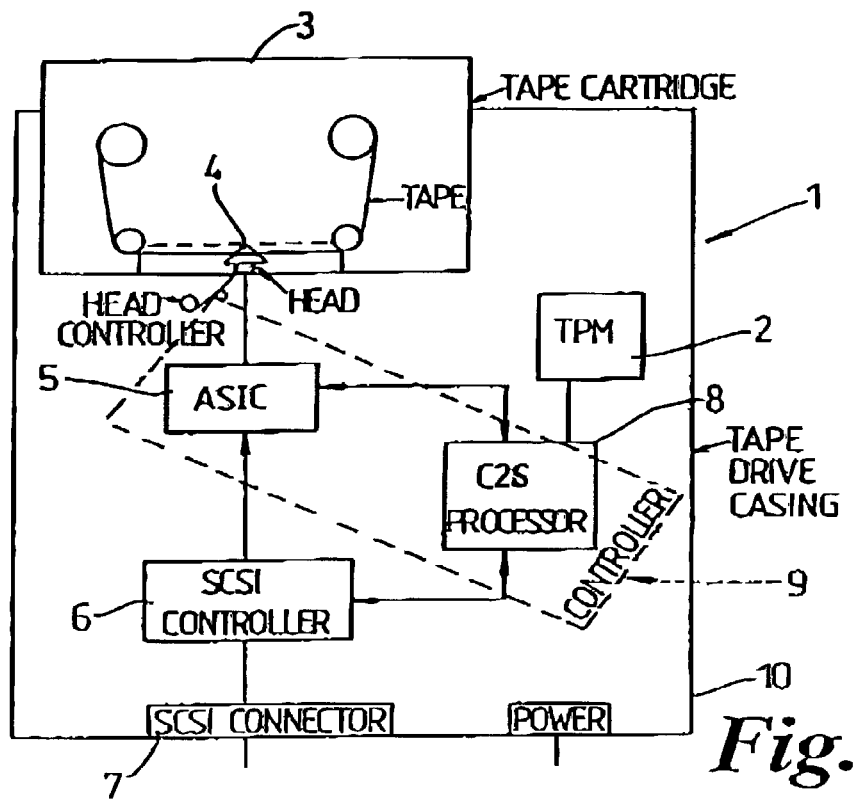
FIG. 1 is a block circuit diagram of a tape drive incorporating a trusted device in the form of a trusted platform module.

FIG. 1 shows a tape drive assembly 1 which is largely conventional except for the important incorporation of a trusted device in the form of a trusted platform module (TPM) 2. The tape drive assembly I comprises a removable tape cartridge 3, a read/write head 4 which communicates with an application specific integrated circuit (ASIC) 5. An SCSI controller 6 provides an interface between the ASIC 5 and an SCSI connector 7 for connection to a network link, such as an Ethernet bus. A C2S processor 8 runs the ASIC 5 in controlling the data flow to and from the head 4. The ASIC takes data and formats it.

The ASIC 5 and C2S processor 8 together constitute a tape drive controller 9.

In accordance with the invention, housed inside the tape drive casing 10 is the TPM 2 which is in the form of an independently-encapsulated module resistant to tampering. In this example, the TPM 2 can be of the form described in the above-mentioned Patent Specification No. WO 00/48063, with particular reference to FIG. 3 thereof. The basic functions provided by such a TPM are indicated in FIG. 4 hereof.

Figure 4:
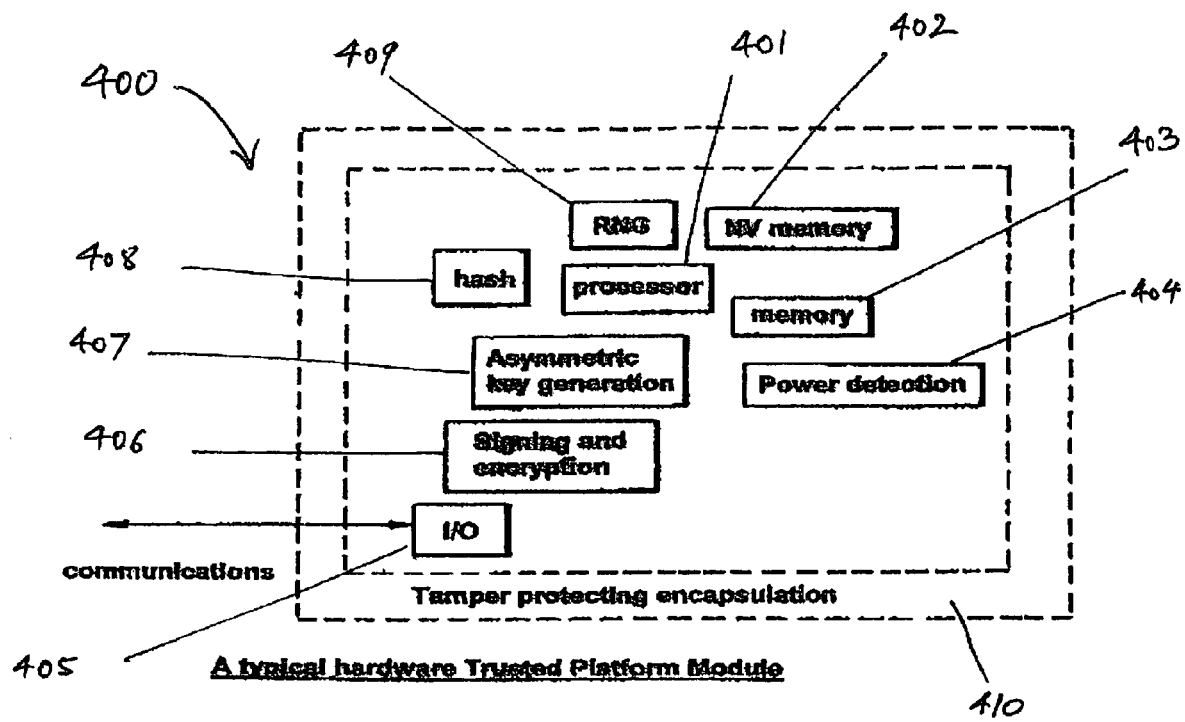
FIG. 4 is a block diagram of a trusted platform module, TPM.

A TPM, such as TPM 400 in FIG. 4, includes a processor 401, a non-volatile memory 402, a memory 403, a power detection function 404, an I/O (input/output) 405, a signing and encryption function 406, an asymmetric key generation function 407, a hash function 408, a random number generator (RNG) 409, and a tamper protecting encapsulation 410 housing all of the above-listed components of TPM 400. Processor 401 is arranged for controlling the overall operation of TPM 400. Signing and encryption function 406 is arranged for signing, encrypting or decrypting specified data. I/O 405 is arranged for connecting TPM 400 to external components, such as C2S processor 8 or controller 9/9' etc. The components of TPM 400 have access (typically via processor 401) to appropriate volatile memory 403 and/or non-volatile memory 402. Hash function 408 is arranged for computing a hash total. RNG 409 is arranged for generating a random number needed for strong authentication.

The TPM 2 communicates directly with the C2S processor 8 and via processor 8 with the ASIC 5. The software/firmware of C2S processor 8 and of ASIC 5 are modified, as compared with a conventional tape drive, in order to provide appropriate interactions with TPM 2.

One of the functions performed by the TPM on receipt of a new delivery instruction by the SCSI connector 7 from the bus connected thereto is to provide an identity, and the method of providing and verifying that identity is preferably by reference to an identifier contained in non-volatile memory in the TPM.

Figure 5:
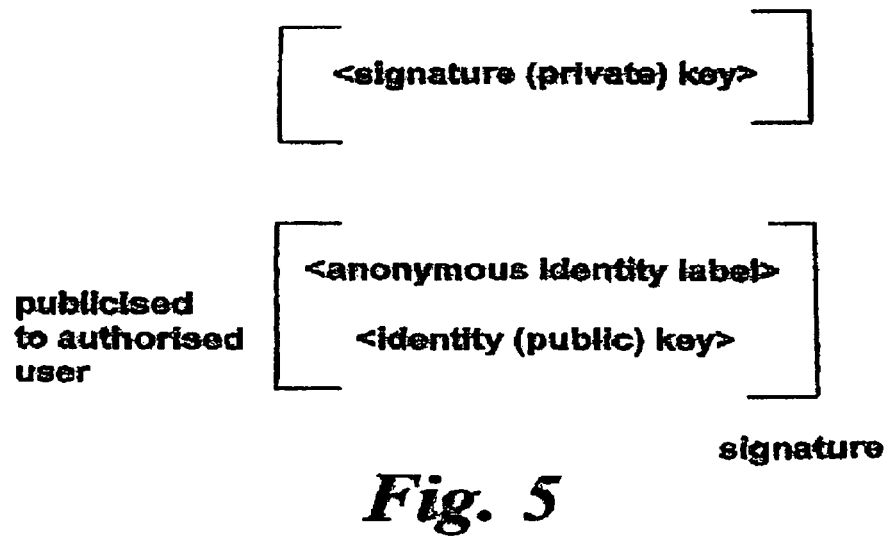
FIG. 5 is the format of a certificate that can be provided by a TPM to prove identity of the associated storage box.

FIG. 5 shows the forms of a TCPA identifier that is preferably employed by the TPM to provide the identity of the TPM. The identifier is in the form of a signed certificate.

Once the identity of the tape drive 1 has thus been confirmed to the client computer, the integrity of the controller 9 is required to be demonstrated. This is preferably demonstrated by the TPM computing a hash total of selected elements of software contained in a chip of the controller 9, which may be the ASIC chip itself and/or a chip of the C2S processor 8. The chosen chip/s thus provides the root of trust for integrity measurement.

The hash total is provided to the client computer which compares the measured hash total, in manner described in Specification WO00/48063 with an authenticated hash total.

Thus, the TPM 2 provides the root of trust for integrity reporting of the tape drive 1, and the root of trust for integrity measurement is one of the other chips within the tape drive.

Figure 2:
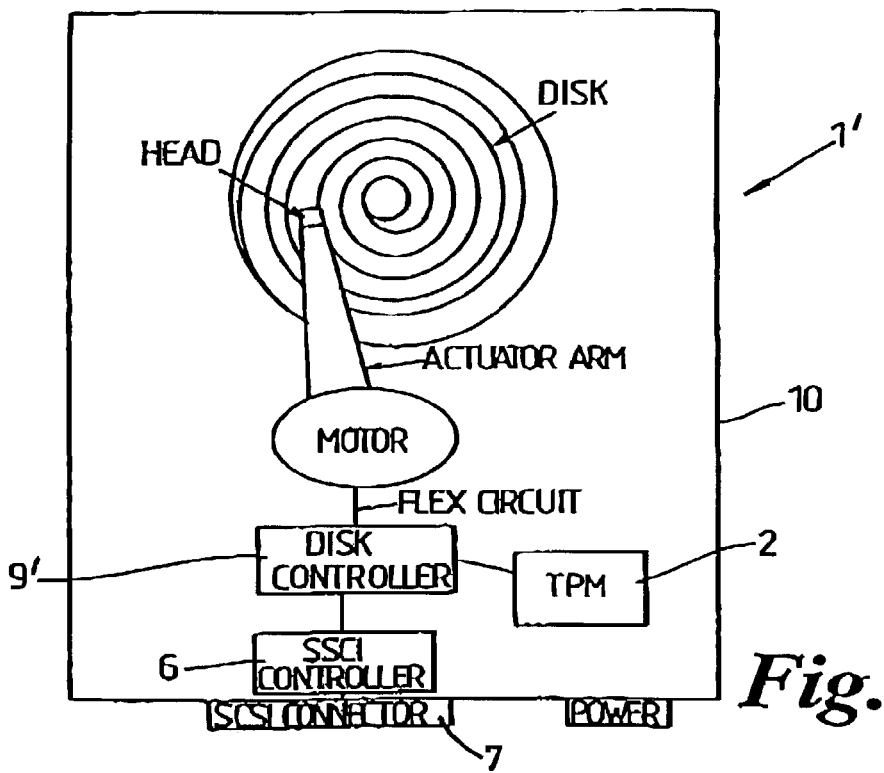
FIG. 2 is a block circuit diagram of a bard disk drive incorporating a trusted device in the form of a trusted platform module.

With reference to FIG. 2, an otherwise conventional hard disk drive 1' may similarly be modified in accordance with the invention) by incorporation of a TPM 2 inside casing 10 and which functions in association with the disk controller 9'. The hard disk drive will usually incorporate multiple platters provided with spiral tracks in known manner.

Figure 3:
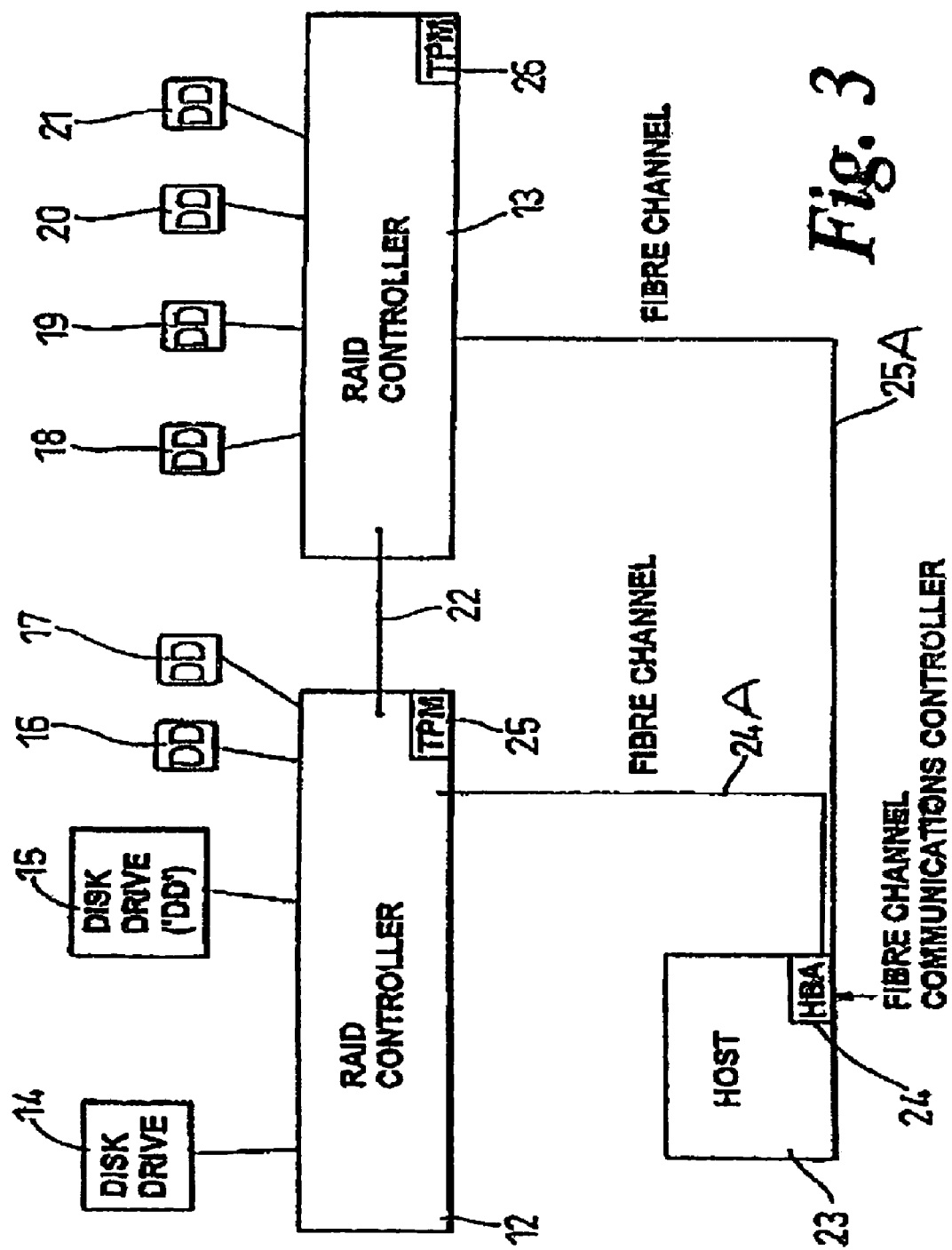
FIG. 3 is a block diagram of a bulk storage assembly incorporating two RAID units.

FIG. 3 shows the incorporation of a TPM in a bulk storage facility comprising an assembly of two RAID (redundant array of independent disks) controllers 12, 13 with their disk drive units 14, 15, 16, 17, 18, 19, 20, 21. Equally, the number RAID controllers could be 1 or more than 2. The two RAID controllers 12, 13 shown in FIG. 3 are linked together by link 22 and are connected to a common host 23 by way of respective fibrechannel links 24A, 25A, the host 23 being provided with a fibrechannel communications controller 24 for connection to an external fibrechannel link. Fibrechannel are multiple-fibre optical links of high capacity and speed.

Each of the RAID controllers 12, 13 incorporates a TPM 25, 26 each configured to provide similar functionality to the TPM 2 of the embodiments of FIGS. 1 and 2.

It would be possible to use bulk storage in the form of silicon storage devices (SSD's) that use RAM memory chips. A TPM could be embedded in this architecture to provide similar functions to those described herein in relation to the tape and disk drives.

Reading and Writing to the Storage Box Memory

Figure 6:
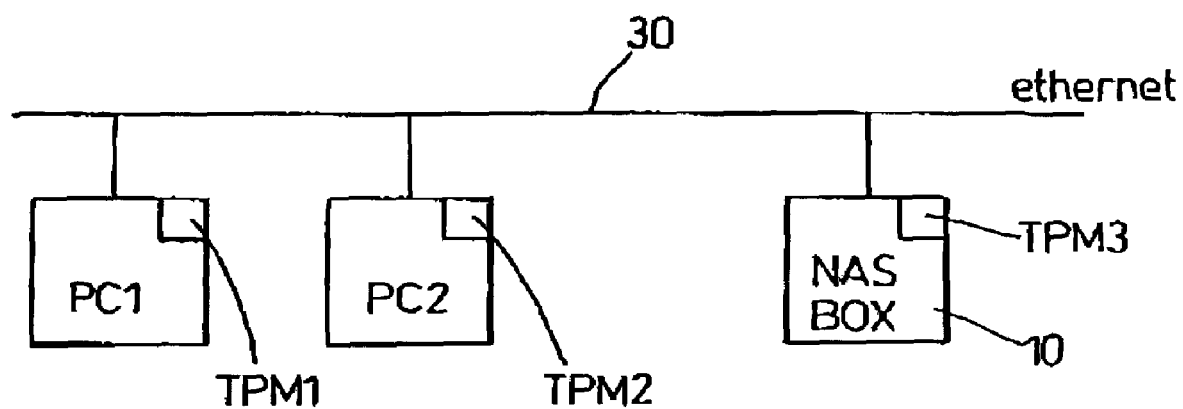
FIG. 6 is a block diagram of part of a network.

FIG. 6 shows a typical NAS network in which a NAS box 10 is able to communicate with client personal computers PC1 and PC2 by way of, typically, an Ethernet link 30. The computer platforms of PC1 and PC2 are provided with respective trusted platform modules, TPM1 and TPM2, which can be as described in specification WO 00/48063 with reference to FIG. 3 thereof.

When the user of PC1 wishes to store a category of data in the NAS box 1, PC1 and NAS box 10 first must establish each other's credentials by an exchange of questions and answers between TPM1 and TPM3. This involves PC1 supplying a TCPA identifier of the user to TPM3. TPM3 has previously been provided with a collection of keys which it might need to authorise use of the NAS box and it extracts a key from the identifier submitted by the user of PC1 with the stored collection of identifiers. Assuming that the preferred identifier is acceptable to TPM3 the PC1 is enabled to permit data to be communicated by the link 30 to allocated data storage locations of the NAS box.

The allocation of storage locations includes some storage locations which must first be filled with the TCPA identifier provided by the user, before the data is allowed to be read to the other allocated locations, whereby the data is stored in conjunction with the TCPA identifier.

When, later, an authorised reader of the stored data requires to access the data, the authorised reader must present its TCPA identifier to the NAS box 10 in order to be permitted by TPM3 and the controller of the NAS box 10 to access the stored data. TPM3 will compare the preferred TCPA identity with the TCPA identity stored with the data and will only permit access to the data, by way of link 30, when the identities match. The verification of identity is performed using the public key cryptographic methods embodied in the TCPA identification procedure.

It will therefore be appreciated that the manner of storing data in NAS box 10 provides appropriate security functionality appropriate to the network environment Data can be moved between nodes in a confidential manner regardless of the network topography, providing control mechanisms for data access, and the secure generation and storage of private keys.

The invention claimed is:

1. A method of storing data on a network storage device, the method comprising:
   causing a trusted device of the network storage device to (i) provide an identity of the trusted device and/or (ii) demonstrate an integrity of a controller of the network storage device,
   upon successful confirmation of the identity of the trusted device and/or successful demonstration of the integrity of the controller to a client computer, causing the client computer to send identification data and data to be stored to the network storage device via a network link, and
   causing the trusted device of the network storage device to write the data to be stored to at least one memory storage location in conjunction with an identifier, the identifier being derived from the identification data sent by the client computer.

2. The method of claim 1, further comprising
   storing in a memory of the trusted device a log of associated identification data and identifiers derived from said identification data.

3. The method of claim 1, wherein the trusted device (i) provides the identity thereof in the form of a signed certificate and (ii) demonstrates the integrity of the controller by computing and providing to the client computer a hash total of selected elements of software contained in a chip of the controller.

4. A network, comprising a network storage device and a client computer, the network storage device and the client computer being communicable via a network link, the network storage device comprising memory storage locations, a controller for controlling reading and writing of data from and to the memory storage locations, and a trusted device, the network being configured such that, in use, the trusted device (i) provides an identity of the trusted device and/or (ii) demonstrates an integrity of the controller of the network storage device, upon successful confirmation of the identity of the trusted device and/or successful demonstration of the integrity of the controller to a client computer, the client computer sends identification data and data to be stored to the network storage device, and the trusted device of the network storage device causes the data to be stored to be written to at least one memory storage location in conjunction with an identifier, the identifier being derived from the identification data sent by the client computer.

5. The network of claim 4, wherein said controller comprises a first processor configured to control the reading and writing operations of a read/write head of said network storage device;

said trusted device comprises a second processor different from the first processor, a non-volatile memory, and an input/output interface via which said second processor is communicated with said first processor of the controller; and said trusted device further comprises a tamper-resistant encapsulation housing therein said second processor, said non-volatile memory, and said input/output interface.

* * * * *